United States Patent [19]

Okumura et al.

[11] Patent Number: 5,902,644
[45] Date of Patent: May 11, 1999

[54] COATING WITH A BASE COAT COMPRISING A POLYEPOXY COMPOUND, A POLYCARBOXY COMPOUND AND MELAMINE AND A CLEAR COAT

[75] Inventors: Yasumasa Okumura; Hiroshi Igarashi, both of Yokohama; Hiroshi Kitagawa, Hiratsuka; Hironori Tonomura, Nagoya, all of Japan

[73] Assignee: Kansai Paint Company, Limited, Hyogo-Ken, Japan

[21] Appl. No.: 08/863,687

[22] Filed: May 27, 1997

Related U.S. Application Data

[62] Division of application No. 08/724,841, Oct. 3, 1996.

[30] Foreign Application Priority Data

Oct. 5, 1995 [JP] Japan .................................. 7-258812

[51] Int. Cl.$^6$ ........................................................ B05D 3/02
[52] U.S. Cl. .......................... 427/386; 427/327; 525/113; 525/166; 525/208; 525/438
[58] Field of Search ..................................... 525/208, 113, 525/166, 438; 427/327, 386

[56] References Cited

U.S. PATENT DOCUMENTS

| | | | |
|---|---|---|---|
| 4,710,543 | 12/1987 | Chattha et al. | 525/161 |
| 4,960,828 | 10/1990 | Higuchi et al. | 525/162 |
| 5,196,485 | 3/1993 | McMonigal et al. | 525/438 |
| 5,369,153 | 11/1994 | Barsotti et al. | 525/101 |
| 5,536,794 | 7/1996 | Yezrielev et al. | 525/443 |

*Primary Examiner*—Robert E. Sellers
*Attorney, Agent, or Firm*—Armstrong, Westerman, Hattori, McLeland & Naughton

[57] ABSTRACT

A method of forming a topcoat from a base coat and clear coat comprises applying to the surface of an undercoat or intercoat a base coat containing (A) a compound having at least two epoxy groups per molecule, (B) a compound having at least two carboxyl groups per molecule, wherein at least one of compounds (A) and (B) possesses hydroxyl groups, (C) a melamine resin with from 0.3–3.5 imino groups, from 2–5.5 alkyl ether groups per triazine nucleus and having a polymerization degree of from 1.6–3.5, and (D) pigment(s); then applying a clear coat prepared from (A) a compound having at least two epoxy groups per molecule and (B) a compound having at least two carboxyl groups per molecule, and curing by heating.

3 Claims, No Drawings

COATING WITH A BASE COAT COMPRISING A POLYEPOXY COMPOUND, A POLYCARBOXY COMPOUND AND MELAMINE AND A CLEAR COAT

This is a division of application Ser. No. 08/724,841 filed Oct. 3, 1996, pending.

The present invention relates to a base coat composition for forming a topcoat, the composition being capable of giving a coating film excellent in finishing appearance, chipping resistance, recoat adhesion and the like, and a coating method using same.

Generally, a base coat composition such as a metallic or solid-color coating composition or the like and a clear coat composition are used for forming a topcoat on an automotive exterior panel or like substrates. The topcoat is formed by succesively superposing said two kinds of coating compositions on the coating surface of an undercoat or intercoat composition usually applied to the substrate. Conventionally used as the topcoat compositions are thermosetting coating compositions mainly comprising a hydroxyl-containing acrylic resin and a melamine resin. However, various problems owing to the melamine resin have been pointed out.

For example, if the base coat composition and the clear coat composition both contain a melamine resin, the resulting coating film is unsatisfactory in acid resistance, although good in finishing appearance, recoat adhesion, chipping resistance, etc. If a clear coat composition free from a melamine resin is used in combination with a base coat composition containing melamine resin to improve the acid resistance, the resulting coating film is improved in acid resistance but poor in finishing appearance and recoat adhesion If the base coat composition and the clear coat composition are both free from a melamine resin, the resulting coating film is good in acid resistance, but has drawbacks such as lowering of finishing appearance and chipping resistance.

Further, a method has been proposed for improving the acid resistance of a coating film using a clear coat composition which mainly comprises a carboxyl-containing compound and an epoxy-containing acrylic resin and is free from a melamine resin. However, said clear coat composition, when used in combination with the above base coat composition, can not give a coating film having satisfactory performance characteristics such as finishing appearance, chipping resistance and recoat adhesion.

An object of the present invention is to solve the above problems. Stated specifically, an object of the present invention is to improve the acid resistance, finishing appearance, recoat adhesion and chipping resistance of a topcoat formed by successively applying a base coat composition and a clear coat composition.

The present inventors conducted extensive research to solve the above problems and found that a coating film excellent in finishing appearance, chipping resistance and recoat adhesion can be formed when using, as the base coat composition, a composition mainly comprising an epoxy-containing compound, a carboxyl-containing compound, a specific melamine resin and a coloring or metallic pigment, at least one of said epoxy-containing compound and said carboxyl-containing compound having a hydroxyl group. They further found that when a specific clear coat composition is applied to the coating surface of said base coat composition, the resulting topcoat is excellent also in acid resistance. The present invention has been accomplished based on these findings.

The present invention provides a base coat composition for forming a topcoat mainly comprising:

(A) a compound having at least two epoxy groups in one molecule,
(B) a compound having at least two carboxyl groups in one molecule,
(C) a melamine resin of a polymerization degree of 1.6 to 3.5 having 0.3 to 3.5 imino groups per triazine nucleus, 0.3 to 3.5 methylol groups per triazine nucleus and 2 to 5.5 alkyl ether groups per triazine nucleus, and
(D) a coloring pigment and/or a metallic pigment, at least one of the components (A) and (B) having a hydroxyl group.

The present invention also provides a method for forming a topcoat from a base coat composition and a clear coat composition, said base coat composition being the above base coat composition and said clear coat composition mainly comprising (A) a compound having at least two epoxy groups in one molecule and (B) a compound having at least two carboxyl groups in one molecule.

A topcoat formed from the above base coat composition of the present invention is excellent in finishing appearance, chipping resistance and recoat adhesion. Further, when the base coat composition is used in combination with the above clear coat composition, the resulting coating film is improved also in acid resistance.

For repairing a cured topcoat, the topcoat is sometimes recoated with a topcoat composition. The term "recoat adhesion" used herein means the adhesion between the topcoat to be repaired and the coating film of the base coat composition applied for repair.

The components of the base coat composition of the present invention are described below in further detail.

Component (A): a compound having at least two epoxy groups in one molecule

The most preferable example of said compound is an acrylic resin (A-1) prepared by copolymerizing an acrylic monomer and an epoxy-containing monomer as essential monomer components.

Examples of the acrylic monomer include a monoesterification product of acrylic or methacrylic acid with a $C_{1-20}$ monohydric alcohol. The acrylic monomer does not contain a functional group such as epoxy, hydroxyl, carboxyl or like group. The epoxy-containing monomer is a compound having one polymerizable double bond and one epoxy group in one molecule, and includes, for example, glycidyl acrylate, glycidyl methacrylate, methyl glycidyl acrylate, methyl glycidyl methacrylate and the like.

Examples of the resin (A-1) further include copolymers obtained by copolymerizing the above acrylic monomer and epoxy-containing monomer together with other monomers such as styrene, vinyltoluene, acrylonitrile, methacrylonitrile, vinyl acetate, vinyl chloride, etc. Said other monomers can be used in a suitable amount without specific limitation, but preferably in an amount equivalent to or less than that of the above acrylic monomer.

The resin (A-1) contains the epoxy-containing monomer preferably in such a proportion that the resin (A-1) has at least two epoxy groups in one molecule and has an epoxy equivalent of 200 to 2,800, especially 300 to 700. Stated specifically, it is suitable that the resin (A-1) contain 5 to 60% by weight, especially 20 to 50% by weight of the epoxy-containing monomer based on the total amount of the monomers forming said resin. A suitable number average molecular weight of the resin (A-1) is about 3,000 to about 100,000, especially about 4,000 to about 50,000.

The resin (A-1) has at least two epoxy groups in one molecule, and may further have a hydroxyl group, or both a hydroxyl group and a hydrolyzable silyl group. It is preferable for said resin to have these functional groups, since the resulting cured coating film has an increased mechanical strength and is still more improved in chipping resistance, recoat adhesion, etc. Examples of the hydrolyzable silyl group are silanol group, alkoxysilane group and the like.

Hydroxyl groups can be introduced by copolymerizing a hydroxyl-containing monomer together with the acrylic monomer and the other monomers. Examples of the hydroxyl-containing monomer include monoesterification products of acrylic or methacrylic acid with a $C_{2-10}$ glycol, such as hydroxyethyl acrylate, hydroxyethyl methacrylate, hydroxypropyl acrylate, hydroxypropyl methacrylate and the like. Further, ring-opening esterification products of these hydroxyl-containing monomers with ε-caprolacton are also usable. The hydroxyl-containing monomer is used preferably in a proportion of 2 to 60% by weight, especially 5 to 50% by weight based on the total weight of the monomers forming the resin (A-1). The hydroxyl equivalent is preferably 10 to 200 mg KOH/g, especially 20 to 120 mg KOH/g.

Hydrolyzable silyl groups can be introduced by copolymerizing a hydrolyzable silyl-containing monomer together with the acrylic monomer and other monomers. Examples of the hydrolyzable silyl-containing monomer are vinyltrimethoxysilane, vinyltriethoxysilane, vinyltris(2-methoxyethoxy)silane, γ-acryloyloxypropyltrimethoxysilane, γ-methacryloyloxypropyltrimethoxysilane, vinyltriacetoxysilane, vinyltrichlorosilane, β-acryloyloxyethyltrimethoxysilane, β-methacryloyloxyethyltrimethoxysilane, γ-acryloyloxypropyltriethoxysilane, γ-methacryloyloxypropyltriethoxysilane, γ-acryloyloxypropylmethyldimethoxysilane, γ-methacryloyloxypropylmethyldimethoxysilane, γ-acryloyloxypropyltriisopropenyloxysilane, γ-methacryloyloxypropyltriisopropenyloxysilane, vinyl(tri-β-methoxyethoxy)silane and the like. The proportion of the hydrolyzable silyl-containing monomer is preferably 2 to 30% by weight, especially 5 to 20% by weight based on the total weight of the monomers forming the resin (A-1).

The resin (A-1) has epoxy groups in the molecule and may have a hydroxyl group and/or a hydrolyzable silyl group when necessary, but does not have other functional groups (such as carboxyl group).

In addition to the epoxy-containing acrylic resin (A-1), usable as the component (A) are an alicyclic epoxy compound (A-2) such as 7-oxabicyclo(4,1,0)hepto-3-ylmethyl ester, a glycidyl ether of a hydrogenated bisphenol (A-3), a glycidyl ether of an aliphatic polyhydric alcohol having at least two hydroxyl groups in one molecule (A-4), and other compounds having at least two epoxy groups in one molecule.

Component (B): a compound having at least two carboxyl groups in one molecule

At least one of the following compounds (B-1) to (B-6) can be used as the component (B).

(B-1): a compound to which at least two carboxyl groups have been introduced by ring-opening addition of a polybasic anhydride to hydroxyl groups in an acrylic resin via half esterification The compound (B-1) can be obtained, for example in the following manner. A hydroxyl-containing acrylic resin is prepared by copolymerizing, as essential monomer components, the acrylic monomer and the hydroxyl-containing monomer shown above for the component (A). Then, a polybasic anhydride is added to some or all of the hydroxyl groups in the obtained acrylic resin by half esterification reaction, to thereby open the anhydride ring and introduce free carboxyl groups.

The hydroxyl-containing acrylic resin before the half esterification reaction has at least two hydroxyl groups in one molecule. A suitable hydroxyl equivalent is 10 to 200 mg KOH/g, especially 20 to 120 mg KOH/g. The number average molecular weight is preferably about 3,000 to about 100,000, especially about 4,000 to about 50,000.

Examples of the polybasic anhydride to be half-esterified are phthalic anhydride, maleic anhydride, tetrahydrophthalic anhydride, hexahydrophthalic anhydride, hexachloroendomethylenetetrahydrophthalic anhydride, trimellitic anhydride, pyromellitic anhydride, succinic anhydride and the like.

The half esterification reaction can be carried out by a conventional method. The anhydride ring opens by said reaction, whereby one carboxyl group undergoes esterification reaction with a hydroxyl group in the acrylic resin and the other is bonded to the acrylic resin in the free state.

The compound (B-1) can be obtained also by first subjecting the polybasic anhydride and the hydroxyl-containing monomer to half esterification reaction and then copolymerizing the half esterification product and an acrylic monomer, together with the hydroxyl-containing monomer when necessary.

The compound (B-1) has at least two carboxyl groups in one molecule, and may further have a hydroxyl group. It is suitable that said compound have an acid value of 10 to 200 mg KOH/g, especially 20 to 120 mg KOH/g, and a hydroxyl value of 190 mg KOH/g or less, preferably 5 to 120 mg KOH/g, more preferably 10 to 100 mg KOH/g.

(B-2): a compound to which at least two carboxyl groups have been introduced by ring-opening addition of a polybasic anhydride to hydroxyl groups in a polyhydric alcohol having at least two hydroxyl groups in one molecule via half esterification reaction Said polyhydric alcohol is an alkylene (straight- or branched-chain or alicyclic) polyhydric alcohol or an alkylene ether polyhydric alcohol and has at least two hydroxyl groups in one molecule. Examples of such polyhydric alcohols are dihydric alcohols such as ethylene glycol, propylene glycol, trimethylene glycol, tetraethylene glycol, dipropylene glycol, butanediol, pentanediol, 2,3-dimethyltrimethylene glycol, hexanediol, cyclohexanedimethanol and the like; trihydric or higher valent alcohols such as glycerine, trimethylolpropane, trimethylolethane, diglycerine, hexanetriol, pentaerythritol, dipentaerythritol, sorbitol mannite and the like; alkylene ether polyol prepared by etherifying these dihydric alcohols and/or trihydric or higher valent alcohols; and the like.

At least two free carboxyl groups are introduced by the addition of the above polybasic anhydride to some or all of the hydroxyl groups in the polyhydric alcohol via half esterification reaction, which can be carried out in a conventional manner. Said reaction is a mere addition of the polyhydric alcohol with the polybasic anhydride, and thus polyesterification reaction does not proceed.

The compound (B-2) has at least two carboxyl groups introduced by the half esterification, and may further have a hydroxyl group. It is suitable that said compound have an acid value of 50 to 500 mg KOH/g, especially 80 to 300 mg KOH/g, and a hydroxyl value of 200 mg KOH/g or less, preferably 0 to 150 mg KOH/g.

(B-3): a compound to which at least two carboxyl groups have been introduced by ring-opening addition of a polybasic anhydride to hydroxyl groups in a polyester resin via half esterification reaction Said polyester resin is obtained by subjecting a polyhydric alcohol having at least two hydroxyl groups in one molecule and a polybasic acid having at least two carboxyl groups in one molecule to esterification reaction using said polyhydric alcohol in excess, and has at least two hydroxyl groups in one molecule. It is suitable that the polyester resin have a hydroxyl value of 50 to 300 mg KOH/g, especially 80 to 150 mg KOH/g, and a number average molecular weight of about 500 to about 5,000, especially about 500 to about 2,000.

The polyhydric alcohols shown above for the compound (B-2) can be suitably employed for preparing said polyester resin. Examples of said polybasic acid are dibasic acids such as terephthalic acid, isophthalic acid, phthalic acid, naphthalenedicarboxylic acid, biphenyldicarboxylic acid, hexahydrophthalic acid, hexahydroterephthalic acid, hexahydroisophthalic acid, adipic acid, sebacic acid, suberic acid, succinic acid, maleic acid, fumaric acid, azelaic acid, itaconic acid, dimer acid and the like, and tribasic or higher valent basic acids such as trimellitic acid, pyromellitic acid and the like.

The half esterification reaction of the polyvalent carboxylic anhydride with hydroxyl groups in the polyester resin can be carried out in a conventional manner, and at least two carboxyl groups are introduced by the ring opening of the polyvalent carboxylic anhydride.

The compound (B-3) has, in one molecule of the polyester resin, at least two carboxyl groups introduced by half esterification reaction, and may further have a hydroxyl group. It is suitable that said compound have an acid value of 30 to 300 mg KOH/g, especially 80 to 150 mg KOH/g, and a hydroxyl value of 0 to 150 mg KOH/g, especially 0 to 100 mg KOH/g.

(B-4): a compound prepared by subjecting an polyhydric alcohol and a polybasic acid to esterification reaction using the polybasic acid in excess so that the compound has at least two carboxyl groups per molecule The compound (B-4) is prepared by subjecting the polyhydric alcohol and the polybasic acid shown above for the compound (B-3) to esterification reaction using the polybasic acid in excess so that the compound has at least two free carboxyl groups per molecule. It is suitable that said compound have a number average molecular weight of about 500 to about 5,000, especially about 500 to about 2,000, an acid value of 30 to 200 mg KOH/g, especially 30 to 100 mg KOH/g, and a hydroxyl value of 50 mg KOH/g or less, preferably 0 to 30 mg KOH/g, more preferably 0 to 10 mg KOH/g.

(B-5): an acrylic resin prepared by copolymerizing a carboxyl-containing monomer and an acrylic monomer as essential monomer components The carboxyl-containing monomer is a compound having one polymerizable unsaturated bond and at least one free carboxyl group in one molecule. Examples of said monomer are acrylic acid, methacrylic acid, maleic acid, fumaric acid, citraconic acid, mesaconic acid and the like. Examples of the acrylic monomer are those shown above for the component (A). The compound (B-5) includes compounds prepared using a hydroxyl-containing monomer and other monomers for the copolymerization in addition to the essential monomers.

The compound (B-5) has at least two carboxyl groups in one molecule, and may further have a hydroxyl group. It is suitable that said compound have an acid value of 10 to 200 mg KOH/g, especially 30 to 150 mg KOH/g, an hydroxyl value of 180 mg KOH/g or less, preferably 0 to 150 mg KOH/g, more preferably 0 to 100 mg KOH/g.

(B-6): a compound prepared by copolymerizing an acid anhydride group-containing monomer and an acrylic monomer as essential monomer components to obtain an acrylic resin, and opening the ring of acid anhydride groups in the acrylic resin using a half-esterifying agent to produce carboxyl groups The anhydride group-containing monomer is a compound having one polymerizable unsaturated bond and at least one anhydride group in one molecule. Examples of said monomer are maleic anhydride, itaconic anhydride and the like. Examples of the acrylic monomer are those shown above for the component (A). The acrylic resin includes those prepared using other monomers for the copolymerization in addition to the essential monomers. The acid anhydrous group-containing monomer, the acrylic monomer and other monomers can be copolymerized in a conventional manner. The proportions of these monomers are 5 to 50% by weight, especially 10 to 30% by weight of the acid anhydride group-containing monomer, 95 to 50% by weight, especially 90 to 70% by weight of the acrylic monomer, and 50% by weight or less, especially 0 to 30% by weight of the other monomers.

Suitable half-esterifying agents for acid anhydride groups in the acrylic resin are compounds having a hydroxyl group as active hydrogen, such as methanol, ethanol, propanol, methyl cellosolve, ethyl cellosolve, dimethylethanolamine, diethylaminoethanol and the like.

The compound (B-6) thus obtained has at least two free carboxyl groups in one molecule. It is suitable that said compound have an acid value of 30 to 280 mg KOH/g, especially 80 to 180 mg KOH/g.

Among the compounds (B-1) to (B-6), the compounds (B-1), (B-2), (B-5) and (B-6) are especially preferable since they are low in viscosity and thus easily convert the base coat composition to a high-solid one.

In the composition of the present invention, it is necessary that at least one of the components (A) and (B) have a hydroxyl group. If neither of the components (A) and (B) contain a hydroxyl group, the resulting cured coating film has poor mechanical strength and is inferior in finishing appearance, chipping resistance, recoat adhesion and the like.

Component (C): A melamine resin of a polymerization degree of 1.6 to 3.5 having 0.3 to 3.5 imino groups per triazine nucleus, 0.3 to 3.5 methylol groups per triazine nucleus and 2 to 5.5 alkyl ether groups per triazine nucleus The melamine resin is obtained by reacting formaldehyde with a part of the amino groups in melamine (2,4,6-triamino-1,3,5-triazine) for hydroxymethylation, and then alkyl-etherifying a part of the methylol groups with an alcohol.

For preparing the component (C), formaldehyde is not reacted with all of the amino groups of the triazine nucleus, but is reacted to such a degree that 0.3 to 3.5, preferably 0.5 to 2.5 imino groups remain per triazine nucleus. Then, an alcohol is reacted with a part of the produced methylol groups for alkyl-etherification to introduce 2 to 5.5, preferably 2.5 to 4 alkyl ether groups per triazine nucleus. The obtained component (C) contains 0.3 to 3.5, preferably 0.5 to 2 methylol groups per triazine nucleus.

The alcohol for alkyl-etherification is a $C_{1-4}$ monohydric alcohol and includes, for example methyl alcohol, ethyl alcohol, propyl alcohol, butyl alcohol and the like. The hydroxymethylation and the etherification can be carried out by a conventional method.

If the polymerization degree of the component (C) is less than 1.6, the crosslinking reactivity with the components (A) and (B) decreases, whereas if said degree is more than 3.5, the viscosity of the composition when applied becomes high. If the component (C) has less than 0.3 imino group per triazine nucleus, the crosslinking reactivity with the components (A) and (B) decreases, whereas more than 3.5 imino groups per triazine nucleus result in reduced storage stability of the base coat composition. If the component (C) has less than 0.3 methylol group per triazine nucleus, the crosslinking reactivity with the components (A) and (B) decreases, whereas more than 3.5 methylol groups per triazine nucleus result in reduced storage stability of the base coat composition. Thus, the polymerization degree and the numbers of imino groups and methylol groups outside the specified range are not preferable.

Further, if the component (C) contains less than two alkyl ether groups per triazine nucleus, the storage stability of the base coat composition reduces, whereas more than 5.5 alkyl ether groups result in reduced crosslinking reactivity with the components (A) and (B). Thus, the number of alkyl ether groups outside the specified range is not preferable. For example, if full-etherified melamine; such as hexamethoxymethylol melamine, is used in combination with the components (A) and (B), the crosslinking reactivity is unsatisfactory. Use of a sulfonate type catalyst for improving the crosslinking reactivity inhibits the epoxy-carboxyl crosslinking reactivity of the components (A) and (B), failing to accomplish the contemplated effect of the present invention.

The base coat composition of the present invention comprises the above components (A), (B) and (C) as essential resin components in proportions suitably selected according to the purposes. Preferred proportions are, for example, 5 to 80% by weight, especially 20 to 60% by weight of the component (A), 3 to 60% by weight, especially 5 to 30% by weight of the component (B) and 5 to 60% by weight, especially 20 to 50% by weight of the component (C), based on the total weight of the components (A) to (C). A suitable hydroxyl value based on the total weight of the components (A), (B) and (C) is 5 to 120 mg KOH/g, especially 20 to 80 mg KOH/g.

The base coat composition of the present invention further comprises, in addition to the components (A), (B) and (C), a coloring pigment and/or a metallic pigment (D) as an essential component. The composition of the invention can be prepared by dispersing these components into an organic solvent by mixing.

The coloring pigment for use as the component (D) includes, for example, inorganic coloring pigments such as titanium white, carbon black, ocher, molybdate red, chrome yellow, cobalt green, ultramarine blue and the like, and organic coloring pigments such as azo type, quinacridone type, perylene type, benzimidazolone type, phthalocyanine type and like pigments. Examples of the metallic pigment are aluminum powder, mica powder, metallic oxide-coated mica powder, mica-like iron oxide powder and the like. The amount of the component (D) can be suitably selected according to the purpose, but is preferably about 2 to about 120 parts by weight per 100 parts by weight of the components (A), (B) and (C) in total.

The base coat composition of the present invention may further comprise, when necessary, conventional additives for coating compositions, such as extender pigments, pigment-dispersing resins, rheology controlling agents (e.g., nonaqueous dispersion resins, microgel particulate resins crosslinked in the particles, etc.), curing catalysts, anti-settling agents, UV absorbers, surface modifier, light stabilizer and the like.

Examples of the curing catalysts are phosphate esters such as monobutyl phosphate, dibutyl phosphate, di-2-ethylhexyl phosphate, phosphoric acid neopentylglycol diglycidyl ether, dimethyl phosphate and the like; quaternary salts such as tetrabutyl ammonium salt, tetrabutyl phosphonium salt and the like; etc. Preferable examples of the pigment-dispersing resin include hydroxyl-containing acrylic resins and polyester resins, etc. These additives are used preferably in an amount of 50 parts by weight or less per 100 parts by weight of the components (A), (B) and (C) in total.

The base coat composition of the invention is preferably prepared by dispersing the above components into an organic solvent to attain a solid concentration of 20 to 60% by weight and applied. The application can be carried out, for example, by spray coating, electrostatic coating and like methods.

The base coat composition of the invention is suitably used, especially as a metallic or solid-color coating composition for forming a topcoat comprising a metallic or solid-color coat and a clear coat, the topcoat being formed in a coating process for forming an undercoat (such as cationic electrodeposition coat), an intercoat (when necessary) and a topcoat on an automotive exterior panel. When the composition of the invention is used as the solid-color coating composition, the application of the clear coat composition may be omitted.

Stated more specifically, the topcoat is formed by applying a metallic or solid-color coating composition comprising the base coat composition of the present invention to the surface of the undercoat or intercoat, and after or without curing the base coat by heating, applying a clear coat composition to the surface of the base coat, followed by curing by heating. The thickness of the base coat is preferably 10 to 40 $\mu$m (when cured), and the thickness of the clear coat is preferably 20 to 80 $\mu$m (when cured). The coats are cured preferably by heating at 100 to 180° C. for 10 to 40 minutes.

According to the coating method of the present invention, a topcoat is formed by applying a base coat composition and a clear coat composition, said base coat composition being the above base coat composition according to the invention, and said clear coat composition mainly comprising (A) a compound at least two epoxy groups in one molecule and (B) a compound having at least two carboxyl groups in one molecule.

The clear coat composition for use in the method of the invention is an organic solvent type coating composition which comprises the epoxy-containing compound (A) and the carboxyl-containing compound (B) and is free from a melamine resin.

The above compounds (A-1) to (A-4) can be suitably used as the component (A).

Among these compounds, the acrylic resin (A-1) prepared by copolymerizing an acrylic monomer and an epoxy-containing monomer as essential monomer component is most suitably used. Usable acrylic monomers and epoxy-containing monomers are those shown above for the resin (A-1).

At least one of the above compounds (B-1) to (B-6) is suitably used as the compound (B) having at least two carboxyl groups in one molecule.

Among these compounds, the compounds (B-1), (B-2), (B-5) and (B-6) are especially preferable since they are low in viscosity and thus easily convert the clear coat composition to a high-solid one.

According to the present invention, the clear coat composition preferably comprises 20 to 80% by weight of the component (A) and 80 to 20% by weight of the component (B) based on the total weight of the components (A) and (B).

It is preferable that the component (A) and/or the component (B) of the clear coat composition have a hydroxyl group, since an improved recoat adhesion results. Said component (A) and/or (B) may also have a hydrolyzable silyl group.

The clear coat composition for use in the present invention essentially comprises the above components (A) and (B) and can be prepared by dispersing these components into an organic solvent by mixing. Said composition may further contain conventional additives for coating compositions, such as rheology controlling agents (e.g., nonaqueous dispersion resins, microgel particulate resins crosslinked in the particles, etc.), curing catalysts, anti-settling agents, UV absorbers, light stabilizers and the like.

Examples of usable curing catalysts include quaternary salts such as tetrabutyl ammonium salt, tetrabutyl phosphonium salt and the like.

The clear coat composition of the invention is preferably prepared by dispersing the above components into an organic solvent to attain a solid concentration of 20 to 60% by weight and applied. The application can be carried out, for example, by spray coating, electrostatic coating and like methods.

It is especially preferable that the clear coat composition be applied to the thermally cured or uncured coating surface of the metallic or solid-color base coat composition of the invention.

Stated specifically, the metallic or solid-color coating composition comprising the base coat composition of the invention is applied to the surface of an undercoat or intercoat, and after or without curing the base coat by heating, the above clear coat composition is applied to the surface of the base coat, followed by curing by heating. The thickness of the base coat is preferably 10 to 40 μm (when cured), and the thickness of the clear coat is preferably 20 to 80 μm (when cured). The coats are cured preferably by heating at 100 to 180° C. for 10 to 40 minutes.

The present invention is described below with reference to Preparation Examples, Examples and Comparative Examples wherein the parts and percentages are all by weight.

PREPARATION EXAMPLE 1

Preparation of component (A) of base coat composition

As monomer components, n-butyl methacrylate (45%), glycidyl methacrylate (35%) and hydroxyethyl acrylate (20%) were subjected to copolymerization reaction using xylene and azobisisobutylonitrile as a solvent and a polymerization initiator, respectively, giving a solution of an acrylic resin (A-i) with a solid content of 70%. The obtained resin had an epoxy equivalent of 406, a number average molecular weight of 5,000 and a hydroxyl value of 109 mg KOH/g.

PREPARATION EXAMPLE 2

Preparation of component (B) of base coat composition

As monomer components, styrene (20%), n-butyl methacrylate (47.5%) and hydroxyethyl methacrylate (32.5%) were subjected to copolymerization reaction using xylene and azobisisobutyronitrile as a solvent and a radical polymerization initiator, respectively, giving an acrylic resin. Hexahydrophthalic anhydride (23.1%) was subjected to addition to the obtained acrylic resin by half esterification reaction, giving a solution of a carboxyl-containing compound (B-i) with a solid content of 55%. The obtained compound had an acid value of 68 mg KOH/g, a hydroxyl value of 46 mg KOH/g and a number average molecular weight of 7,000.

PREPARATION EXAMPLE 3

Preparation of component (B) of base coat composition

One mole of trimethylolpropane and 2 mole of hexahydrophthalic anhydride were subjected to half esterification reaction in xylene, giving a solution of a carboxyl-containing compound (B-ii) with a solid content of 70%. The obtained compound had an acid value of 252 mg KOH/g, a hydroxyl value of 126 mg KOH/g and a molecular weight of 446.

PREPARATION EXAMPLE 4

Preparation of component (B) of base coat composition

As monomer components, styrene (20%), n-butyl methacrylate (60%), acrylic acid (10%) and hydroxyethyl acrylate (10%) were subjected to copolymerization reaction using xylene and azobisisobutylonitrile as a solvent and a radical polymerization initiator, respectively. Thus, a solution of a carboxyl-containing compound (B-iii) was obtained which was an acrylic resin with a solid content of 50%. The carboxyl-containing compound had an acid value of 68 mg KOH/g, a hydroxyl value of 55 mg KOH/g and a number average molecular weight of 7,000.

PREPARATION EXAMPLE 5

Preparation of component (B) of base coat composition

As monomer components, styrene (20%), n-butyl methacrylate (60%) and maleic anhydride (20%) were subjected to copolymerization reaction using xylene and azobisisobutyronitrile as a solvent and a polymerization initiator, respectively, giving an acrylic resin. The acid anhydrous groups in the obtained acrylic resin were subjected to half esterification reaction for ring opening using methanol. Thus, a solution of a carboxyl-containing compound (B-iv) was obtained which was an acrylic resin with a solid content of 55%. The obtained carboxyl-containing compound had an acid value of 107 mg KOH/g, a hydroxyl value of 0 mg KOH/g and a number average molecular weight of 5,000.

PREPARATION EXAMPLE 6

Preparation of component (B) of base coat composition

As monomer components, n-butyl methacrylate (70%) and hydroxyethyl acrylate (30%) were subjected to copolymerization reaction using xylene and azobisisobutylonitrile as a solvent and a radical polymerization initiator, respectively, giving a solution of an acrylic resin (B-v) with a solid content of 60%. The obtained acrylic resin had an acid value of 0 mg KOH/g, a hydroxyl value of 163 mg KOH/g and a number average molecular weight of 5,000.

PREPARATION EXAMPLE 7

Preparation of clear coat composition

Using the samples obtained in the above Preparation Examples, clear coat compositions (C-1) and (C-2) were prepared by mixing the components shown in Table 1 in the amounts shown in the table.

TABLE 1

|  | (C-1) | (C-2) |
|---|---|---|
| (A-i) | 51 |  |
| (B-iii) | 128 |  |
| (B-v) |  | 117 |

TABLE 1-continued

|  | (C-1) | (C-2) |
| --- | --- | --- |
| (C-iii) |  | 30 |
| TBAB | 1 |  |
| NACURE 5543 |  | 0.3 |
| TINUVIN 384 | 2 | 2 |
| SANOL LS292 | 1 | 1 |
| KP322 | 0.05 | 0.05 |
| Nonvolatile content when applied (%) | 47 | 54 |

The materials shown in Table 1 are as follows:

TBAB: tetrabutylammonium bromide, curing catalyst

NACURE 5543: tradename of dodecylbenzene sulfonic acid amine salt manufactured by KING Industries (U.S. company), curing catalyst TINUVIN 384: tradename of benzotriazole derivative manufactured by CIBA-GEIGY LTD., UV absorber SANOL LS292: tradename of hindered amine manufactured by Sankyo Co., Ltd., light stabilizer KP322: tradename of modified silicone oil manufactured by SHIN-ETSU SILICONE Co., Ltd., surface modifier

EXAMPLES 1 TO 6 AND COMPARATIVE EXAMPLES 1 TO 3

Using the samples obtained in the above Preparation Examples, base coat compositions of the present invention and comparative base coat compositions were prepared by mixing the components shown in Table 2 in the amounts shown in the table.

TABLE 2

|  | Examples | | | | | | Comp. Ex. | | |
| --- | --- | --- | --- | --- | --- | --- | --- | --- | --- |
|  | 1 | 2 | 3 | 4 | 5 | 6 | 1 | 2 | 3 |
| (A-i) | 57 | 57 | 57 | 33 | 36 | 44 | 81 | 57 |  |
| (B-i) |  |  |  | 86 |  |  |  |  |  |
| (B-ii) | 43 | 43 | 43 |  |  |  | 66 | 43 |  |
| (B-iii) |  |  |  |  | 90 |  |  |  |  |
| (B-iv) |  |  |  |  |  | 72 |  |  |  |
| (B-v) |  |  |  |  |  |  |  |  | 117 |
| (C-i) | 38 | 38 |  | 38 | 38 | 38 |  |  |  |
| (C-ii) |  |  | 34 |  |  |  |  |  |  |
| (C-iii) |  |  |  |  |  |  |  | 30 | 30 |
| Dibutyl phosphate |  | 0.5 |  |  |  |  |  |  |  |
| NACURE 5543 |  |  |  |  |  |  |  | 0.3 | 0.3 |
| ALPASTE 1830YL | 15 | 15 | 15 | 15 | 15 | 15 | 15 | 15 | 15 |
| Nonvolatile content when applied (%) | 42 | 42 | 41 | 35 | 36 | 39 | 40 | 43 | 44 |

The materials shown in Table 2 as the component (C) of the base coat composition are as follows.

(C-i): 80% CYMEL 202 (tradename, melamine resin manufactured by MITSUI CYTEC CO., LTD.) having 1.3 imino groups, 2.81 alkyl ether groups and 0.84 methylol group per triazine nucleus, polymerization degree of 2.1

(C-ii): 88% CYMEL 370 (tradename, melamine resin manufactured by MITSUI CYTEC CO., LTD.) having 0.43 imino group and 3.32 alkyl ether groups and 1.13 methylol groups per triazine nucleus, polymerization degree of 2.6

(C-iii): 100% Cymel 301 (tradename, melamine resin manufactured by MITSUI CYTEC CO., LTD.) having 0.1 imino group, 5.0 alkyl ether groups and 0.2 methylol group per triazine nucleus, polymerization degree of 1.7, for comparison Other materials shown in Table 2 are as follows.

NACURE 5543: tradename, dodecylbenzenesulfonic acid amine salt manufactured by KING Industries (U.S. company), curing catalyst ALPASTE 1830YL: tradename, aluminum flake paste manufactured by TOYO ALUMINUM K.K., metallic pigment Examples 7 to 12 and Comparative Examples 4 to 7

A steel panel was coated with a cationically electrodepositable coating composition (tradename "ELECRON #9800" a polyamine-modified epoxy resin type coating composition manufactured by KANSAI PAINT CO., LTD.) and an intercoating composition (tradename "AMILAC TP-37", alkyd resin-melamine resin type coating composition manufactured by KANSAI PAINT CO., LTD.), and the two coats were cured by heating. The above base coat composition was applied to the obtained coated surface of the steel panel to form a coating film having a thickness of 25 μm (when cured), and allowed to stand at room temperature for 5 minutes. Then, the above clear coat composition was applied to the surface of the base coat to form a coating film having a thickness of 40 μm (when cured) and allowed to stand at room temperature for 5 minutes. The base coat and the clear coat were cured at the same time by heating at 140° C. for 30 minutes.

The combinations of the base coat composition and the clear coat composition used are shown in Table 3.

TABLE 3

|  | Examples | | | | | | Comp. Ex. | | | |
| --- | --- | --- | --- | --- | --- | --- | --- | --- | --- | --- |
|  | 7 | 8 | 9 | 10 | 11 | 12 | 4 | 5 | 6 | 7 |
| Base coat | Examples | | | | | | Comp. Ex. | | | |
| composition | 1 | 2 | 3 | 4 | 5 | 6 | 1 | 2 | 3 | 3 |
| Clear coat composition | C-1 | C-1 | C-1 | C-1 | C-1 | C-1 | C-1 | C-1 | C-1 | C-2 |

The cured topcoat was tested for performance characteristics by the following methods.

Test Methods

Acid resistance: A 0.5 ml quantity of an aqueous solution of sulfuric acid with a concentration of 40% by weight was dropped on the coating surfaces which was then heated at 60° C. for 30 minutes. The condition of the coating surface was visually inspected and rated on the following scale.

A: No change.

B: Etching on the coating surface.

Finishing appearance: The coating surface was visually inspected and rated on the following scale.

A: Good (smooth and glossy).

B: Fair (slightly hazy).

C: Bad (rough and hazy).

Recoat adhesion: The surface of the clear coat obtained above was further coated with the base coat composition and the clear coat composition in the same manner as above, and heated at 120° C. for 30 minutes. Then, cuts were made on the coating surface with a sharp cutting knife to obtain 25 squares of 2 mm×2 mm. A cellophane adhesive tape was applied to the cut surface and rapidly peeled off. The remaining squares were counted and rated on the following scale.

A: 25 squares remained.

B: 1 to 24 squares remained.

C: No squares remained.

Chipping resistance

Fifty grams of No. 7 gravel was blown against the test panel at an angle of 45°, an air pressure of 4 kg/cm$^2$ and a temperature of −20° C. with a gravelometer. The condition of the coating surface was inspected and rated on the following scale.

5: Substantially no peeling.

4: The peeled area was about 1 mm across.

3: The peeled area was about 2 mm across.

2: The peeled area was about 3 to about 4 mm across.

1: Almost the whole coating film was peeled off.

The test results were shown in Table 4.

TABLE 4

|  | Examples | | | | | | Comp. Ex. | | | |
| --- | --- | --- | --- | --- | --- | --- | --- | --- | --- | --- |
|  | 7 | 8 | 9 | 10 | 11 | 12 | 4 | 5 | 6 | 7 |
| Acid resistance | A | A | A | A | A | A | A | A | A | C |
| Finishing appearance | A | A | A | A | A | A | B | C | B | A |
| Recoat adhesion | A | A | A | A | A | A | A | C | C | A |
| Chipping resistance | 5 | 5 | 5 | 4 | 4 | 4 | 1 | 2 | 3 | 3 |

According to the present invention, the following effects can be accomplished.

(1) The coating film formed from the base coat composition of the present invention is excellent in finishing appearance, chipping resistance, recoat adhesion, etc.

(2) When a topcoat is formed by applying, to the coating surface of the base coat composition, a clear coat composition which essentially comprises an epoxy-containing acrylic resin (A) and a carboxyl-containing compound (B) and is free from a melamine resin, the obtained topcoat is excellent in chipping resistance and recoat adhesion and good in finishing appearance, acid resistance, etc.

We claim:

1. A method for forming a topcoat comprising the steps of applying a base coat composition a surface of an undercoat or an intercoat, and after or without curing the base coat by heating, applying a clear coat composition, to a surface of the base coat, followed by curing by heating, said base coat composition mainly comprising (A) a compound having at least two epoxy groups in one molecule, (B) a compound having at least two carboxyl groups in one molecule, (C) a melamine resin of a polymerization degree of 1.6 to 3.5 having 0.3 to 3.5 imino groups per triazine nucleus, 0.3 to 3.5 methylol groups per triazine nucleus and 2 to 5.5 alkyl ether groups per triazine nucleus, and (D) at least one member selected from the group consisting of a coloring organic pigment, a metallic pigment and a coloring inorganic pigment other than the metallic pigment, at least one of the components (A) and (B) having a hydroxyl group, the component (B) being at least one member selected from the group consisting of:

(B-1) a compound prepared by the ring-opening addition of a polybasic acid anhydride to the hydroxyl groups of an acrylic resin via a half-esterification reaction;

(B-2) a compound prepared by the ring-opening addition of a polybasic acid anhydride to hydroxyl groups of a polyhydric alcohol having at least two hydroxyl groups per molecule via a half-esterification reaction;

(B-3) a compound prepared by the ring-opening addition of a polybasic acid anhydride to hydroxyl groups of a polyester resin via a half-esterification reaction;

(B-4) a compound prepared by esterifying a polyhydric alcohol and a polybasic acid using the polybasic acid in excess;

(B-5) an acrylic resin prepared by copolymerizing a monomer mixture comprising a carboxyl-containing monomer and an acrylic monomer other than the carboxyl-containing monomer or a monomer mixture comprising a carboxyl-containing monomer, an acrylic monomer other than the carboxyl-containing monomer and another monomer; and (B-6) a compound prepared by copolymerizing a monomer mixture comprising an acid anhydride group-containing monomer and an acrylic monomer or a monomer mixture comprising an acid anhydride group-containing monomer, an acrylic monomer and another monomer to obtain an acid anhydride-functional acrylic resin, and ring-opening the acid anhydride groups with a hydroxyl group-containing half esterifying agent.

2. The coating method according to claim 1, wherein said clear coat composition is an organic solvent coating composition which essentially comprises said epoxy-containing compound (A) and said carboxyl-containing compound (B) and is free from melamine resin.

3. The coating method according to claim 1 wherein said clear coat composition comprises 20 to 80% by weight of the component (A) and 80 to 20% by weight of the component (B) based on the total weight of the components (A) and (B).

* * * * *